(12) United States Patent
Riley

(10) Patent No.: US 7,096,306 B2
(45) Date of Patent: Aug. 22, 2006

(54) DISTRIBUTED SYSTEM WITH CROSS-CONNECT INTERCONNECT TRANSACTION ALIASING

(75) Inventor: Dwight D. Riley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 429 days.

(21) Appl. No.: 10/209,846

(22) Filed: Jul. 31, 2002

(65) Prior Publication Data

US 2004/0024944 A1   Feb. 5, 2004

(51) Int. Cl.
*G06F 13/20* (2006.01)
*G06F 13/36* (2006.01)

(52) U.S. Cl. ............... 710/313; 710/311; 710/312; 710/314

(58) Field of Classification Search ............. 710/305, 710/306, 311–317
See application file for complete search history.

(56) References Cited

U.S. PATENT DOCUMENTS

| | | | | |
|---|---|---|---|---|
| 5,088,090 | A * | 2/1992 | Yacoby ................. | 370/402 |
| 5,838,932 | A * | 11/1998 | Alzien .................. | 710/314 |
| 6,138,198 | A * | 10/2000 | Garnett et al. ......... | 710/311 |
| 6,175,889 | B1 * | 1/2001 | Olarig .................. | 710/309 |
| 6,233,641 | B1 * | 5/2001 | Graham et al. ......... | 710/316 |
| 6,633,832 | B1 * | 10/2003 | Browen ................ | 702/186 |
| 6,715,011 | B1 * | 3/2004 | Buckland et al. ...... | 710/100 |
| 6,789,154 | B1 * | 9/2004 | Lee et al. .............. | 710/315 |
| 6,832,270 | B1 * | 12/2004 | Das Sharma et al. ... | 710/15 |
| 2002/0085361 | A1 * | 7/2002 | Wachel ................. | 361/803 |
| 2003/0065868 | A1 * | 4/2003 | Riley ................... | 710/313 |
| 2003/0167367 | A1 * | 9/2003 | Kaushik et al. ........ | 710/302 |
| 2003/0188076 | A1 * | 10/2003 | Bronson et al. ....... | 710/311 |
| 2003/0202510 | A1 * | 10/2003 | Witkowski et al. .... | 370/386 |

OTHER PUBLICATIONS

Child, Jeff, "Switched-Bus Schemes Marry Speed to Legacy I/O," Apr. 2000, Penton's Embedded Systems Development, p. 26 30.*
Bhatt, Ajay V., "Creating an Open Standard Third Generation I/O Interconnect," Fourth Quarter 2001, Computer Technology Review, pp. 20-25.*
O'Connor, Richard, "High-Performance Interconnect Sought," May 8, 2000, Electronic Engineering Times, p. 104 and 109 (2 pages).*
Jacobs, April, "PCI-X Ups the Ante on Buses," Nov. 30, 1998, Computerworld, ABI/INFORM Global, pp. 61-62.*
"Aliasing" (Definition of), The American Heritage College Dictionary, 2002, 4th Edition, p. 34.*

* cited by examiner

*Primary Examiner*—Rehana Perveen
*Assistant Examiner*—Nimesh G. Patel

(57) ABSTRACT

An aliasing technique allows transparently connecting multiple interconnects across a shared cross-connect interconnect, allowing devices on one interconnect to communicate with devices on another interconnect as if both interconnects were connected by a single interconnect bridge. Each interconnect appears to the cross-connect interconnect as a device on the cross-connect interconnect. Transactions between devices on different interconnects are aliased by a routing engine connected to the cross-connect interconnect for transmittal across the cross-connect interconnect and are invisible to other transactions on the cross-connect interconnect. Transactions between devices on the same interconnect are invisible to other interconnects. Cache coherent requests are supported by the use of additional attribute bits.

31 Claims, 7 Drawing Sheets

DISTRIBUTED SYSTEM WITH CROSS-CONNECT INTERCONNECT TRANSACTION ALIASING

CROSS-REFERENCE TO RELATED APPLICATIONS

This application is related to the following commonly owned U.S. patents and patent applications, which are hereby incorporated in their entirety by reference for all purposes:

U.S. Pat. No. 6,266,731, entitled "HIGH SPEED PERIPHERAL INTERCONNECT APPARATUS, METHOD AND SYSTEM," by Dwight Riley and Christopher J. Pettey;

U.S. patent application Ser. No. 09/747,422, entitled "HIGH SPEED PERIPHERAL INTERCONNECT APPARATUS, METHOD AND SYSTEM," by Dwight Riley and Christopher J. Pettey, filed Dec. 22, 2000; and U.S. patent application Ser. No. 10/184,164, entitled "POINT-TO-PONT ELECTRICAL LOADING FOR MULTI-DROP BUS," by Michael Y Chan and Dwight C. Riley, filed Jun. 28, 2002.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to computer interconnects and more particularly to using an interconnect as a cross-connect for a distributed system.

2. Description of the Related Art

Early conventional computer systems used a single interconnect, to which the various components of the computer system were connected. The interconnect known today as an Industry Standard Architecture (ISA) interconnect was used in many early computer systems. The name ISA for these interconnects was an afterwards-developed name for a previously unstandardized interconnect used in IBM PC/AT systems. With the advent of interconnects such as the Peripheral Components Interconnect (PCI) interconnect, conventional computer systems began to use a host interconnect for connecting the processor to an interconnect to connect to other components, such as adapter cards. A Host/PCI interconnect bridge typically connects the host interconnect and the PCI interconnect.

The PCI 2.2 specification, a copy of which is incorporated in its entirety by reference, allows for connecting multiple PCI interconnects in an interconnect hierarchy, with PCI-to-PCI bridges. Transactions are routed by the PCI-to-PCI bridges based on an enumeration of the interconnect hierarchy performed at initialization of the computer system. Transactions typically contain information indicating the destination interconnect number and device, which allows the bridges to determine the transaction routing.

Other interconnect architectures have been developed that can also use bridges to interconnect multiple interconnect segments. Further, the PCI-X extension to the PCI standard, as defined in the PCI-X 1.0 specification, a copy of which is incorporated herein in its entirety by reference, modifies the behavior of interconnect bridges in a PCI-X environment.

Additionally, distributed interconnects have been developed such as Ethernet, Infiband, and Fibrechannel. These distributed interconnects typically do not use bridges for connecting multiple interconnects or networks, but use devices such as routers, which route transactions across a network of connected interconnects. Typically, such distributed interconnects do not act as a single interconnect hierarchy, but as multiple connected systems.

Today, the computer industry is looking for a cost effective way to design distributed server blade type architectures. A blade server architecture typically uses an ultra dense collection of processor cards, known as "blades," connected to a common power supply on trays in a rack. Unlike traditional multiprocessor systems, in which a single operating system manages the multiple processors in a unified execution system, a blade server system generally is a collection of independent computer systems, providing benefits such as lower power usage over traditional separately configured computer systems.

In their simplest form, a blade would be a processor and memory. However, conventional blades today are typically a full computer system, with a processor, memory, video chip, etc., all on a board getting power and Ethernet connections from a backplane. Typical blades do not contain interconnect connectors, such as a PCI connectors, because of a perceived difficulty in extending the PCI interconnect across the backplane. Because blades, by definition, are single cards, other conventional PCI devices are not typically connected via PCI slots as in typical desktop systems.

The ability to use interconnects such as PCI in blades for connection to external PCI devices has been desired, to allow reuse of existing PCI hardware and to allow reducing the number of components on the blade.

BRIEF SUMMARY OF THE INVENTION

Briefly, according to one embodiment, a distributed computer system comprises a first subsystem, a second subsystem, and a cross-connect subsystem. The cross-connect subsystem is couplable to the first subsystem and the second subsystem. The cross-connect subsystem comprises a cross-connect interconnect, couplable to the first subsystem and to the second subsystem, the cross-connect interconnect transparently aliasing transactions between the first subsystem and the second subsystem as transactions on the cross-connect interconnect.

In a further embodiment, the first subsystem comprises a first interconnect and the second subsystem comprises a second interconnect, where the first interconnect, the second interconnect and the cross-connect interconnect operate according to a common interconnect protocol.

In a further embodiment, the common interconnect protocol is the PCI-X protocol.

In another further embodiment, the cross-connect subsystem further comprises a first cross-connect connector of the cross-connect interconnect, couplable to the first subsystem interconnect, a second cross-connect connector of the cross-connect interconnect, couplable to the second subsystem and a routing engine, couplable to the first cross-connect connector and to the second cross-connect connector, the routing engine transparently aliasing transactions between the first subsystem and the second subsystem as transactions on the cross-connect interconnect.

In another further embodiment the first subsystem and the second subsystem appear to each other as being directly connected by an interconnect bridge.

In a yet further embodiment the cross-connect subsystem further comprises a cross-connect processor coupled to the routing engine, an operating system executed by the cross-connect processor, the operating system comprising a processor-executable code to create an aliasing table for use by the routing engine, a processor-executable code to update the aliasing table responsive to coupling either of the first subsystem or the second subsystem to the cross-connect subsystem, and a processor-executable code to update the aliasing table responsive to decoupling either of the first subsystem or the second subsystem from the cross-connect subsystem.

In another further embodiment, the cross-connect subsystem appears to the first subsystem and the second subsystem as an interconnect bridge.

In another further embodiment, the first subsystem comprises a first processor, a first processor interconnect coupled to the first processor, and a processor interconnect to interconnect converter, the first subsystem couplable to the cross-connect subsystem through the first processor interconnect to interconnect converter.

In another embodiment, transactions on the first interconnect and the second interconnect include a plurality of cache coherency attributes.

In a yet further embodiment, the second subsystem is a shared memory subsystem. The shared memory subsystem interprets the cache coherency attributes on transactions from the first subsystem to preserve cache coherency.

In a yet further embodiment, a third subsystem shares the shared memory subsystem with the first subsystem, the cross-connect interconnect transparently aliasing transactions between the third subsystem and the second subsystem as transactions on the cross-connect interconnect. The first subsystem and the third subsystem can be invisible to each other.

In another further embodiment, the shared memory subsystem allocates a first portion of the shared memory subsystem to the first subsystem and a second portion of the shared memory resource to the third subsystem.

In another further embodiment, the cross-connect subsystem is a backplane of a blade server. In another further embodiment, the first subsystem and the second subsystem are blades for a blade server.

In another embodiment, a first interconnect of a first subsystem, coupled to a cross-connect interconnect via a first interconnect interface having a first cross-connect device number, the cross-connect interconnect having a cross-connect interconnect number, is assigned a first interconnect number, a second interconnect of a second subsystem, coupled to the cross-connect interconnect via a second interconnect interface having a second cross-connect device number, is assigned a second interconnect number. A transaction from a first device of the first interconnect, having a first device number, received on the first interconnect interface is converted to be destined to a second cross-connect interconnect device number of the cross-connect interconnect. After transmittal across the cross-connect interconnect, the transaction is converted to be destined for a second device of the second interconnect and sent on the second interconnect. The conversion of the transaction to the second cross-connected device can be done at the first interconnect interface. The conversion to be destined to the second device of the second interconnect can be done at the second interconnect interface.

In a further embodiment, an alias table is updated to map the first device number and the first interconnect number to the first cross-connect interface device number and cross-connect interconnect number. The alias table is also updated to map the second device number and the second interconnect number to the second cross-connect interface device number and cross-connect interconnect number.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

A technique is disclosed herein for enhancing the operation of computer system interconnects that use the extensions to the Peripheral Component Interconnect specification (hereinafter PCI-X interconnects), as well as logic circuits and signal protocols thereof. For illustrative purposes, embodiments are described herein for computer systems using Intel Corporation microprocessor architectures and certain terms and references are specific to such processor platforms. PCI-X and the enhancements described herein, however, are hardware independent, and may be used with any host computer designed for this interconnect standard. As will be appreciated by those skilled in the art of computer systems, the disclosed embodiments can be adapted and applied to any computer platform utilizing the PCI-X standard. Further, although the following is described in terms of PCI-X interconnects, other interconnect architectures and protocols, such as the PCI Express (formerly known as 3GIO) interconnect architecture and protocol being promoted by Intel Corporation, Compaq Computer Corporation, Microsoft Corporation, IBM Corporation, and Dell Computer Corporation, could also be used.

Further, the term "interconnect" as used herein refers generally to connections or pathways between two or more points in a computer system and includes bus implementations, such as conventional PCI busses, as well as non-bus implementations, such as serial interconnects, switches or hubs. However, unless otherwise expressly indicated, the term "interconnect" as used herein does not include distributed interconnects such as Ethernet or InfiniBand.

Figure 1:
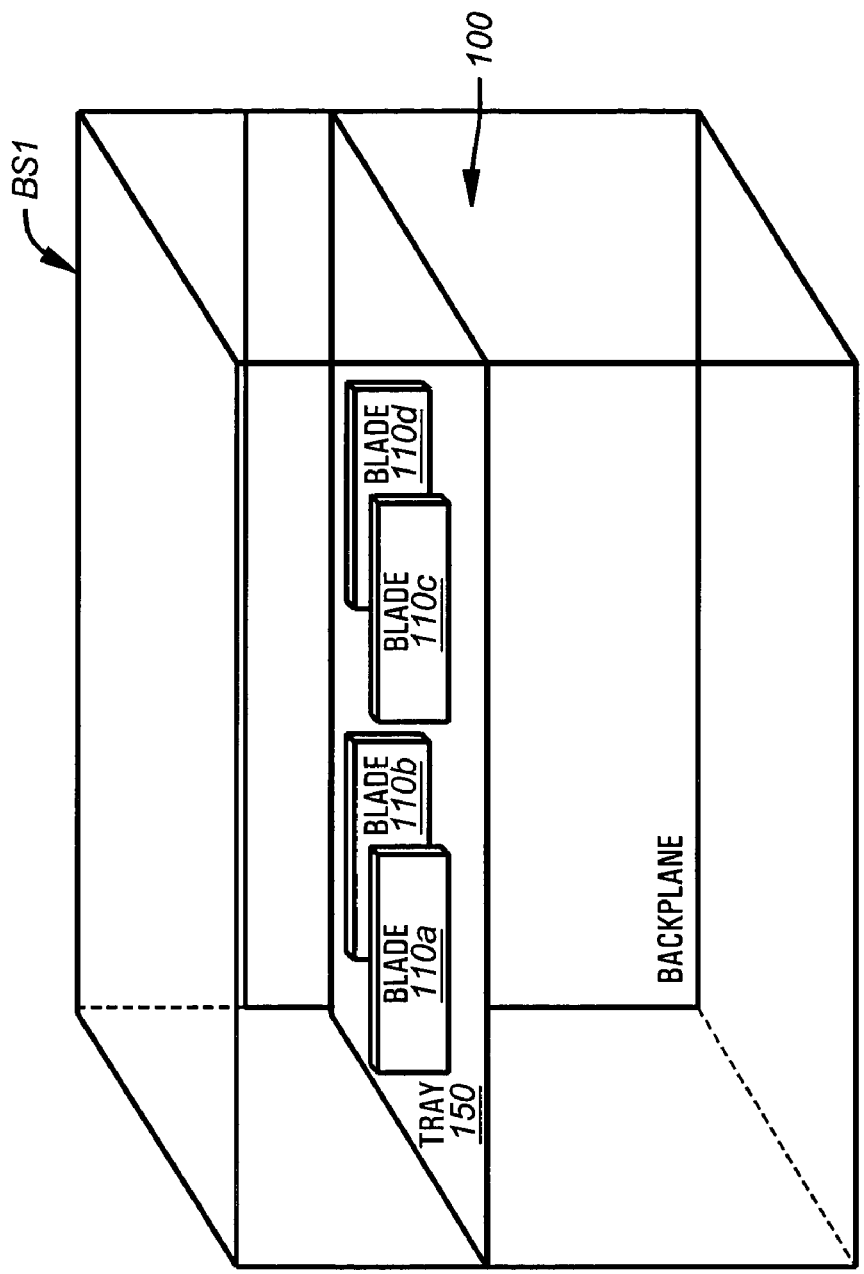
FIG. 1 is a block diagram illustrating a conventional blade server configuration.

Turning now to FIG. 1, a block diagram illustrates a conventional blade server configuration. One skilled in the art will recognize that the configuration shown is illustrative and exemplary only. Certain commonplace elements of a blade server configuration, such as power supplies, are not shown for clarity of the drawing.

A conventional blade server BS1 as shown in FIG. 1 has a backplane 100 providing power and networking connections to one or more trays 150 of blades 110. One of ordinary skill in the art will recognize that backplanes as described herein may be configured using cables instead of a PCB board.

The tray 150 typically transparently passes power and networking connections between each of the blades 110, shown in FIG. 1 as blades 110a–110d, and the backplane 100. In a typical conventional blade server, these network connections are a distributed network, typically using Ethernet or InfiniBand. However, other distributed interconnect protocols can be used.

One perceived advantage of blade servers is the ability to provide ultra dense packing of competing resources in a single blade server, such as the server BS1 of FIG. 1. However, the use of Ethernet or similar distributed networks for the network connections to the backplane 100 from the blades 110 implies that conventional interconnect peripherals, such as PCI-connected devices, are not directly accessed from the blades 100. Rather, each of the blades 110a–110d shown in FIG. 1 typically is a complete computer system, with one or more processor, memory, video, and disc capabilities.

Figure 2:
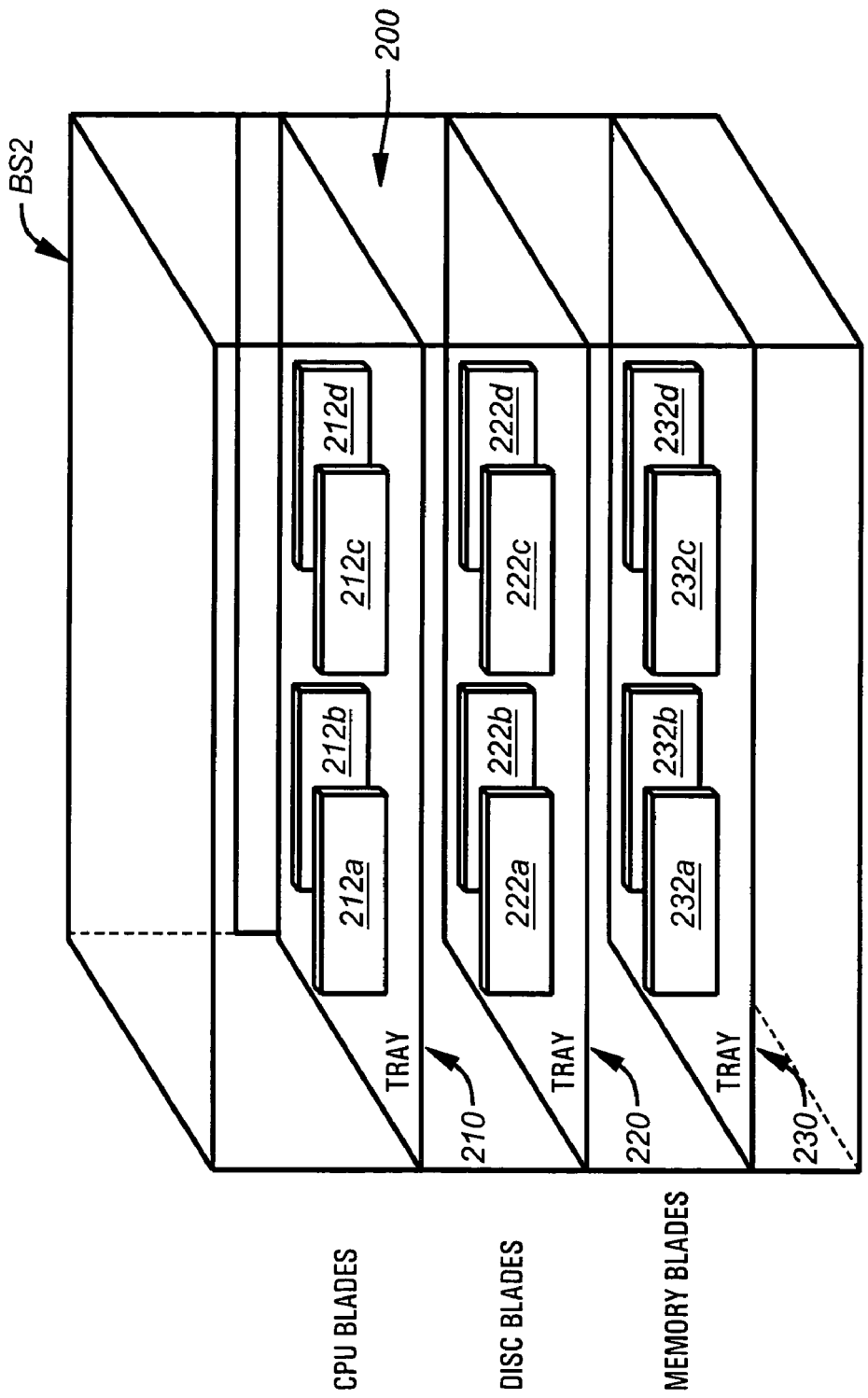
FIG. 2 is a block diagram illustrating a blade server configuration according to one embodiment.

In a disclosed embodiment, illustrated in FIG. 2, a blade server BS2 provides the capability for using simpler blades, which offers the opportunity of even denser packing into the blade server BS2 than the conventional server BS1. The disclosed embodiment of FIG. 2 uses PCI connections from each of blades 212, 222, and 232 in trays 210, 220, and 230 to a backplane 200.

Because the blades 212, 222, and 232 and the backplane 200 use the PCI protocol for networking, the CPU blades 212 can be reduced to a CPU and memory, without the need for other devices conventionally connected as PCI devices in a non-blade server environment that are typically contained on the blades 110 in the conventional blade server BS1 of FIG. 1. For example, as shown in FIG. 2, the tray 220 contains disc blades 222, i.e., cards containing a PCI disc drive, where the disk drive itself is similar to ones in conventional non-blade server environments. In another example, additional memory can be contained in memory blades 232 in tray 230. The disc blades 222 and memory blades 232 can be allocated to the CPU blades 212 in multiple ways. For example, disc blade 222a can be shared between CPU blades 212a and 212b, while disc blades 222c can be exclusively used by CPU blade 212d. Similarly, memory blades 232 can be shared or non-shared. For example, memory blade 232b can be exclusively allocated to CPU blade 212c, while memory blades 232a, 232c and 232d can be shared among CPU blades 212a, 212b, and 212d. One skilled in the art will recognize that these allocations are illustrative and exemplary only, and other interconnections and allocations are possible. The ability to use PCI interconnection offers significant flexibility and reuse of existing devices over conventional blade server configurations.

Although not shown in FIG. 2, multiple blade servers BS2 can be connected into a single interconnect network, as described herein. Furthermore, although FIG. 2 shows tray 210 dedicated to CPU blades, tray 220 dedicated to disc blades, and tray 230 dedicated to memory blades, one skilled in the art will recognize that the number and arrangement of the trays 210–230 is exemplary and illustrative only. In a typical embodiment, the blade server BS2 will have numerous trays, some of which may be populated with multiple types of devices as needed. In addition although described herein as "disc blades" and "memory blades," any conventional PCI device useful in the blade server BS1 can be used on a blade.

Figure 3:
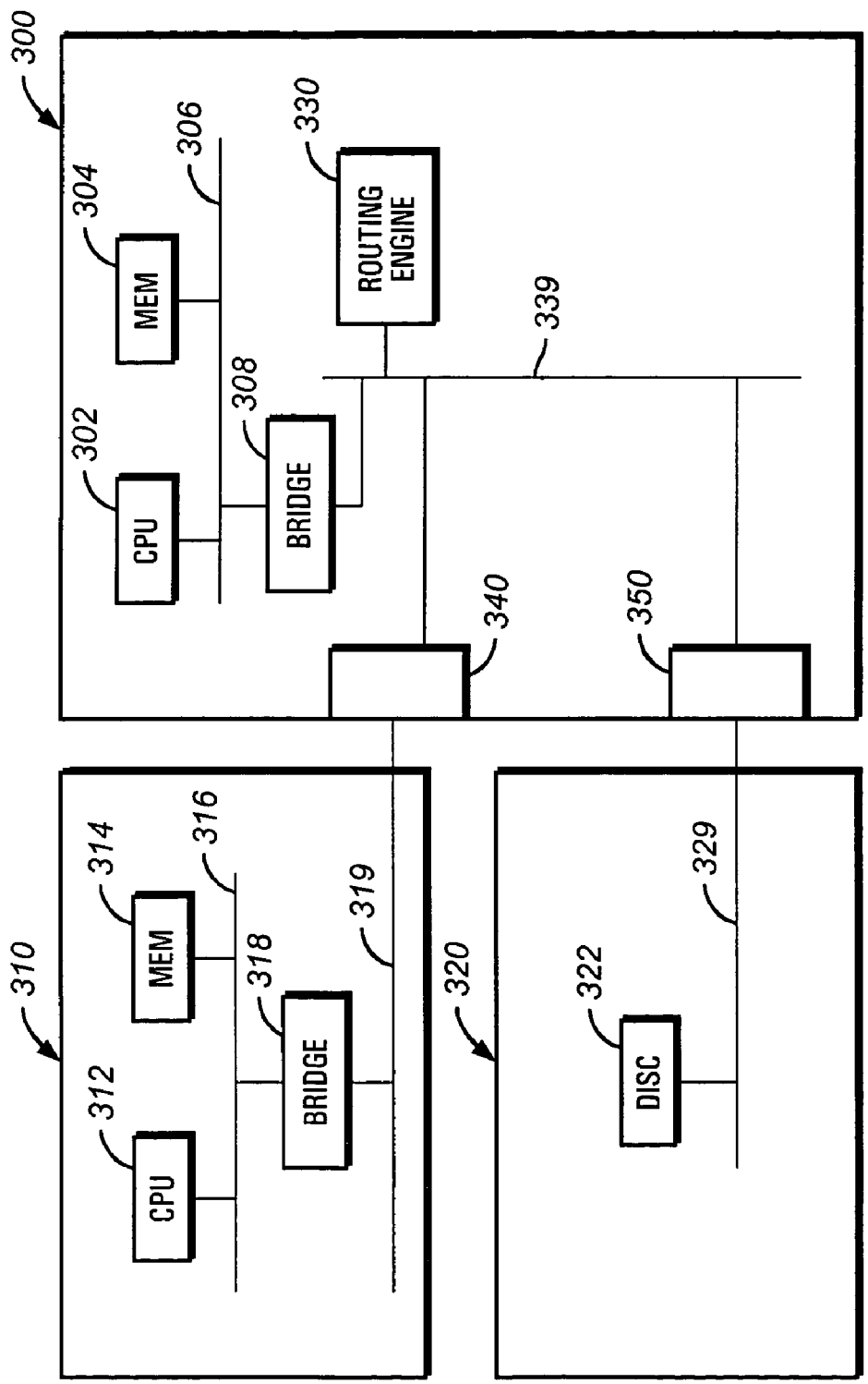
FIG. 3 is a block diagram illustrating coupling a processor blade and a disc blade via a cross-connect interconnect according to one embodiment.

Turning now to FIG. 3, a block diagram illustrates a CPU blade 310 connected via a backplane 300 to a disc blade 320 according to one embodiment. As in FIGS. 1–2, common features such as power supplies and racks for mounting the backplane and blades have been omitted for clarity of the drawings. In addition, trays for the blades 310 and 320 have been omitted.

Blade 310 is a CPU blade as illustrated in FIG. 2. Unlike conventional blades, blade 310 can contain a CPU 312, a memory 314, and a Host/PCI bridge 318, commonly known as a north bridge, without other conventional devices, such as disk drives or video adapters. The bridge 318 bridges between a host interconnect 316, to which are connected the CPU 312 and the memory 314, and a PCI interconnect 319. Other elements can be included on the blade 310 as desired or necessary for a particular application.

Blade 320, in this example a disc blade, contains a conventional disc and disc controller 322 connected to a PCI interconnect 329. For clarity of the drawing, the disc and disc controller are shown as a single element 322, but can be implemented as separate units.

Blades 310 and 320 are connected to backplane 300 via PCI interconnects 319 and 329, which connect to backplane connection points 340 and 350, respectively. The backplane 300 contains a management CPU 302, for controlling the backplane 300 and for allocating device blades to CPU blades in the blade server BS2, and a memory 304, connected to a host interconnect 306. The host interconnect 306 is connected to a cross-connect PCI interconnect 339 by a host/PCI bridge 308, allowing the CPU 302 to control devices connected to the PCI interconnect 339. Other techniques can be used for controlling devices connected to the PCI interconnect 339. The connection point 340 connects the PCI interconnect 319 of CPU blade 310 to the PCI interconnect 339, and the connection point 350 connects the PCI interconnect 329 to the PCI interconnect 339 as is described in more detail below. A routing engine 330 is connected to the PCI interconnect 339 for aliasing transactions between the PCI interconnect 319 and the PCI interconnect 329 as is described in more detail below. One skilled in the art will recognize that other devices can be connected to the PCI interconnect 339 and the host interconnect 306.

The connection points 340 and 350 allow transactions between the CPU blade 310 and the disc blade 320. The connection point 340 makes the CPU blade 310 appear as a device to the PCI interconnect 339, while the connection point 350 makes the disc blade 320 appear as a device on the PCI interconnect 339. The connection points 340 and 350 interact with the routing engine 330 to alias transactions across the PCI interconnect 339 between the connection points 340 and 350. Thus, the backplane 300 allows connecting the blades 310 and 320 into a single interconnect hierarchy.

In one embodiment, the backplane 300 appears as a PCI-to-PCI bridge to the CPU blade 310 and the disc blade 320 during enumeration of the PCI interconnect hierarchy by the CPU blade 310 and the disc blade 320. A ROM or boot image can be located on the CPU blade 310 or on the backplane 300, either on the cross-connect interconnect 339 or in the memory 304. Once a configuration for the distributed system BS2 is established by the management CPU 302 via management software, the ROM or boot image is initialized before the configured blade(s) are permitted to be powered up. Once the ROM or boot image is configured, the CPU blades 310 boots in a conventional manner and configures those resources to which it is connected without any knowledge of the backplane 300 or the cross-connect interconnect 339. The PCI interconnect 339 is invisible or transparent to both the PCI interconnect 319 and the PCI interconnect 329. Thus, transactions on the PCI interconnect 339 are also invisible to the blade PCI interconnects 319 and 329. Further, interconnects 319 and 329 and transactions on the interconnects 319 and 329 are invisible to other blade devices connected to the PCI interconnect 339.

Figure 4:
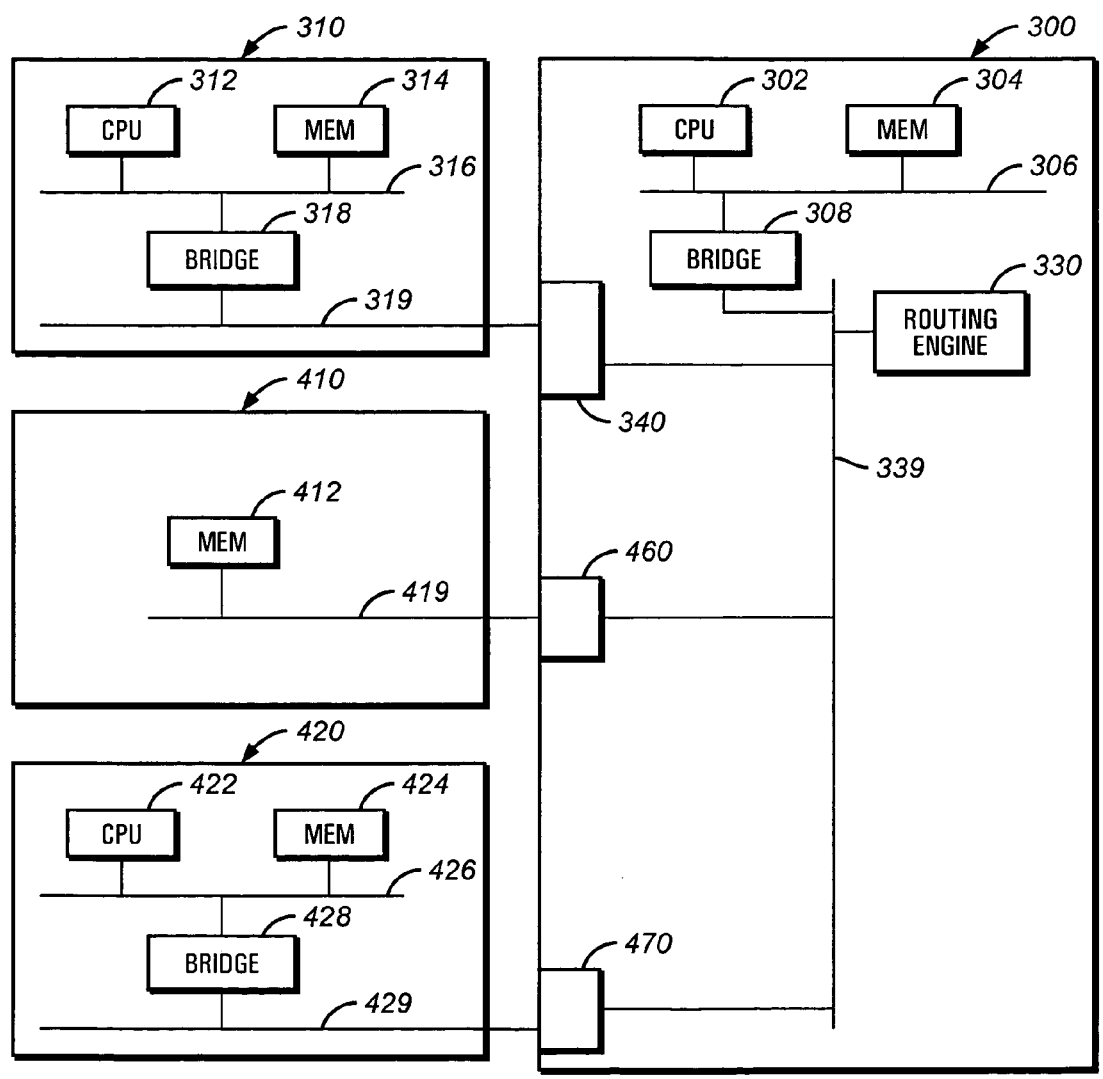
FIG. 4 is a block diagram illustrating coupling the processor blade of FIG. 3, a second processor blade, and a shared memory blade via the cross-connect interconnect of FIG. 3, according to another embodiment.

Turning to FIG. 4, another embodiment is illustrated. Identically numbered elements are identical to elements in FIG. 3. In this embodiment, a memory blade 410, containing a memory 412, which can include a memory controller and other typical memory-related elements, is connected to a PCI interconnect 419, which is connected via the backplane 300 to CPU blades 310 and 420. As shown in FIG. 4, CPU blades 310 and 420 contain similar elements, with CPU blade 420 having a CPU 422, a memory 424, a host interconnect 426, a Host-to-PCI bridge 428, and a PCI interconnect 429. However, one skilled in the art will recognize that the CPU blades 420 can differ internally from the CPU blade 310 in types, numbers, and arrangement of elements, as long as they are both connected to the backplane 300 via their respective PCI interconnects 429 and 319. As in FIG. 3, memory blade 410 and CPU blade 420 are connected to the backplane 300 via connection points 460 and 470, which present the memory blade 410 and the CPU blade 420 as devices on the PCI interconnect 339, aliasing transactions between PCI interconnect 429 and PCI interconnect 419 as transactions on the PCI interconnect 339 with the assistance of the routing engine 330.

In the configuration of FIG. 4, memory 412 can be shared between CPU blades 310 and 420. In one embodiment, additional PCI-X attributes are defined to identify cache coherent requests, to allow the memory blade 410 to support coherent transactions. In conventional multiprocessor systems, the multiple processors typically echo the state of a cache line being manipulated. In a disclosed embodiment, the cache information is passed along with the PCI transaction as PCI attribute information. The attributes can include information about the cache line, whether the memory request is a read request, whether the request requires exclusive access, whether the request is a read modify, snoop status, and other common cache protocol information. One skilled in the art will recognize that other cache protocol information can be provided.

Figure 5:
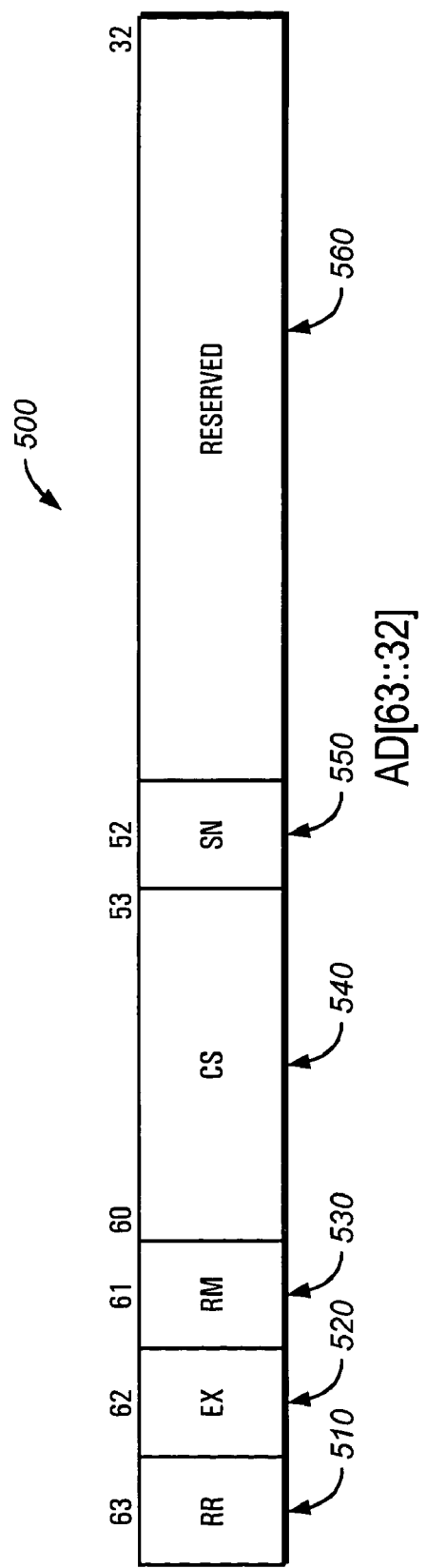
FIG. 5 is a block diagram of a set of cache coherency attributes for use in the embodiment of FIG. 4.

In one embodiment, these attributes are provided in a PCI-X attribute phase, using the AD[63::32] lines, defined as reserved, driven high in the current PCI-X 1.0 specification, a copy of which is incorporated herein in its entirety by reference. FIG. 5 illustrates one embodiment of such a PCI-X attribute phase. During the attribute phase of a transaction carrying cache coherency information, the upper 32 bits 500 of the 64-bit AD interconnect, AD[63::32] can contain the cache coherency attributes as in the exemplary illustration of FIG. 5. Bit 510, shown in FIG. 5 at AD[63::63] indicates whether the memory request of this transaction is a read request. Bit 520, shown as AD[62::62] is used to indicate whether exclusive access is required. Bit 530, shown as AD[61::61], indicates whether the transaction is a read modify. Bit 550, shown as AD[52::52], indicates whether the transaction has been snooped. A cache size field, shown as AD[60::53], indicates the size of a cache line. These field definitions and locations are exemplary and illustrative only, and other cache coherency attributes and arrangements and location of such attributes can be used. Although as shown in FIG. 5 as located in the AD[63::32] portion of the AD interconnect lines, other techniques, such as an additional attribute phase or a message transaction, can be used for transporting the cache coherency attributes.

Figure 6:
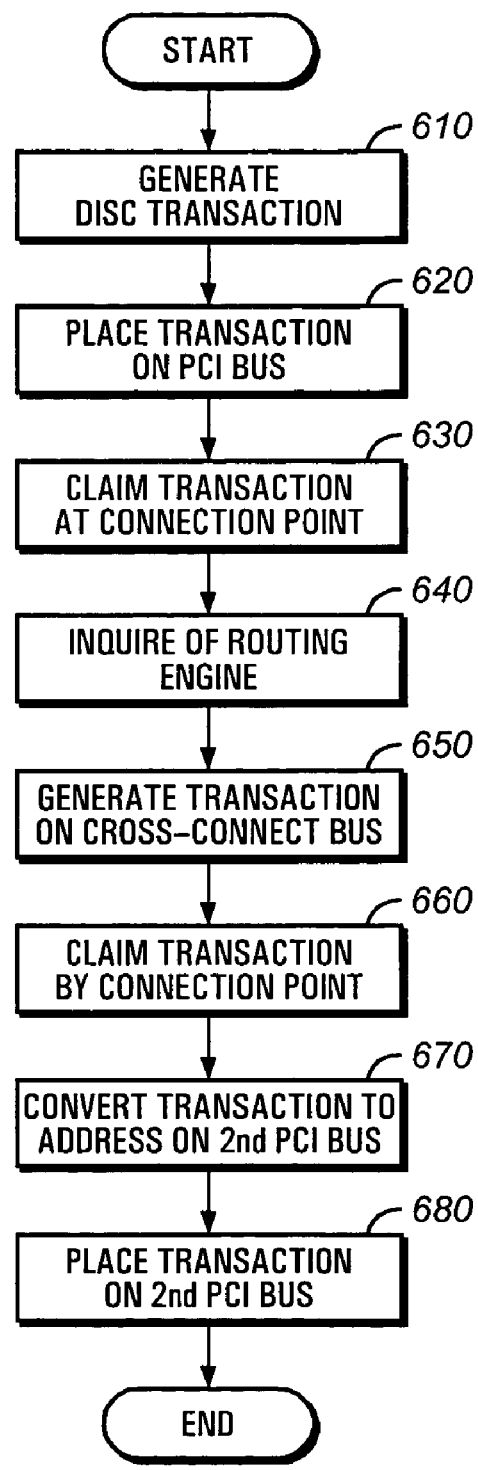
FIG. 6 is a flow chart illustrating aliasing a transaction between the processor blade and the disc blade of FIG. 3, according to one embodiment.

Turning to FIG. 6, a flow chart illustrates aliasing a transaction between the processor blade 310 and the disc blade 320 of FIG. 3, according to one embodiment. In step 610, the processor 312 generates a PCI transaction, specifying the disc drive 322 in the conventional PCI fashion. A previous conventional PCI configuration phase has (not shown) enumerated the PCI hierarchy from the processor blade 310's point of view, assigning interconnect numbers to interconnect segments 319 and 329, as if the disc 322 is connected to the interconnect segment 329 via a PCI-to-PCI bridge between interconnect segments 319 and 329. Unknown to either processor blade 310 or disc blade 320, the "PCI-to-PCI bridge" is actually the cross-connect backplane 300. Although not shown in FIG. 6, the connection points 340 and 350 have, at configuration time, been assigned cross-connect interconnect device numbers.

The transaction is then placed on the PCI interconnect 319 of the processor blade in step 620 after traversing the host interconnect 316 and Host-to-PCI bridge 318. Connection point 340 then, in step 630, positively claims the transaction in the conventional fashion. In one embodiment, in step 640, connection point 340 obtains routing information, which can be an alias table, from the routing engine 330 upon claiming the transaction on PCI interconnect 319. In one disclosed embodiment, the routing information is stored by the connection point 340 for future transactions between the same initiator and target device. Such an embodiment could provide performance enhancements, by avoiding the time delay needed for transactions between the connection point 340 and the routing engine 330. One skilled in the art will recognize that the routing information can be stored using multiple techniques.

Regardless of the technique for determining the routing information, the connection point uses the routing information in step 650 to generate a transaction across the cross-connect interconnect 339 with the connection point 350 to which the disc blades PCI interconnect 329 is connected. The PCI transaction can be a conventional PCI transaction between connection points 340 and 350, modifying the original transaction accordingly to alias the original initiator and target data using the device numbers of the connection points 340 and 350 as necessary.

In step 660, the connection point 350 claims the transaction, using conventional PCI techniques. For clarity of the description, conventional PCI signaling is not further described. The connection point 350 then, in step 670, converts or aliases the transaction from a transaction on the cross-connect interconnect 339 into a transaction on the disc blade 320's PCI interconnect 329. Similarly, actions by the connection point 350, as were performed by connection point 340, use routing information supplied by the routing engine 330 to realias the transaction as being for the PCI interconnect 339.

Then, in step 680 the transaction is placed on the PCI interconnect 329. Although not shown in FIG. 6, the conventional PCI handling of responses to the PCI transaction as generated by the target device, as well as any transaction generated on the disc blade 320 for the processor blade 310, traverses the cross-connect interconnect 339 in a reverse fashion, first claiming and aliasing a transaction on the PCI interconnect 329 by the connection point 350, placing the aliased transaction on the cross-connect interconnect 339, then claiming and dealiasing the transaction by the connection point 340 for placing on the PCI interconnect 319 of the processor blade 310.

Figure 7:
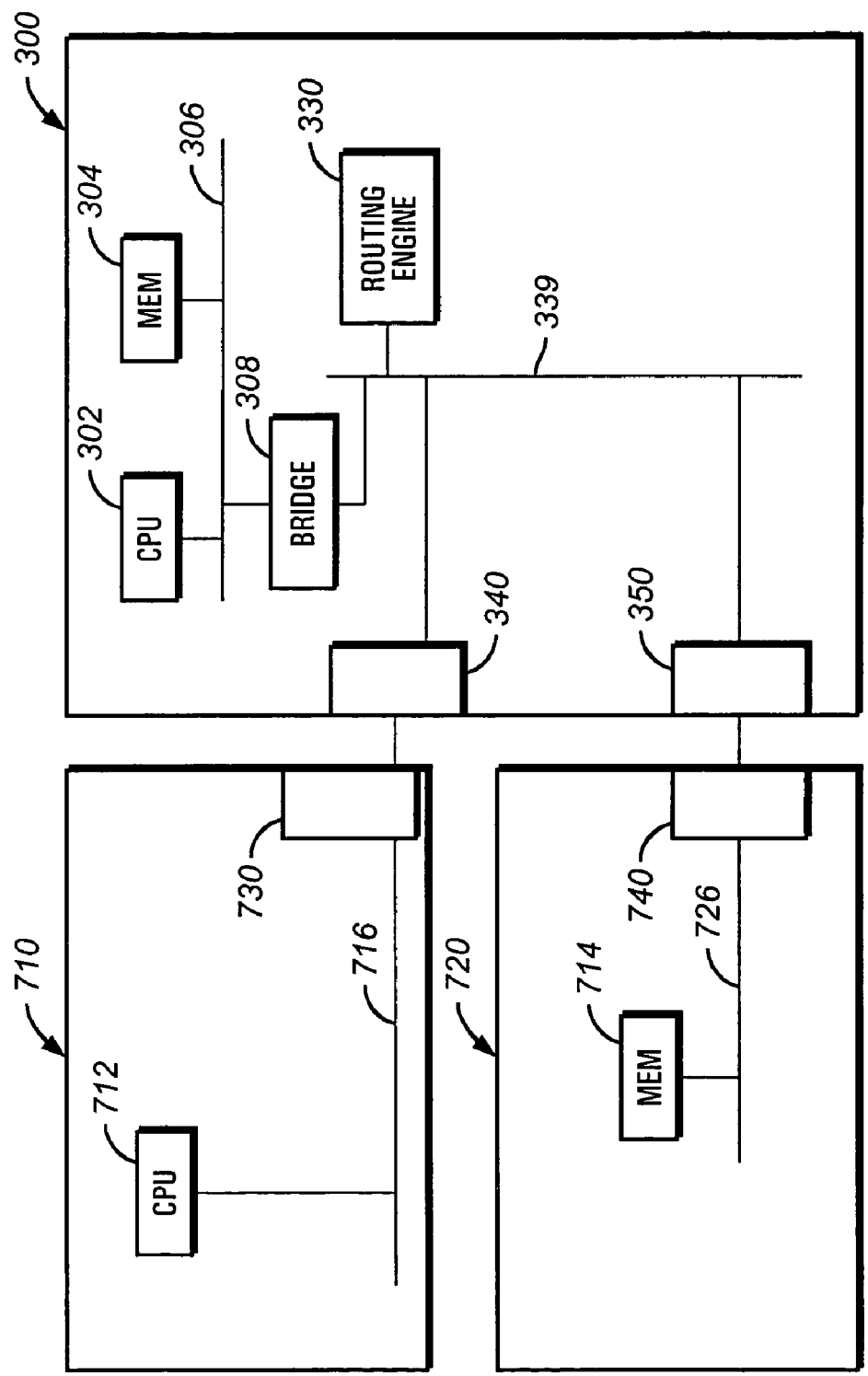
FIG. 7 is a block diagram of a processor blade according to another embodiment.

FIG. 7 illustrates a disclosed embodiment in which a host interconnect or other networking interconnect or line can be connected via the cross-connect backplane 300. As illustrated in FIG. 7, a CPU blade 710 and a memory blade 720 can interconnect a host interconnect 716 and a host interconnect 726 via the cross-connect backplane 300. Host-to-PCI converter modules 730 and 740 convert between host interconnect transactions and PCI transactions. The cross-connect backplane 300 then aliases the PCI transactions for transit across the cross-connect interconnect 339 as explained above. Although FIG. 7 illustrates a Host-to-PCI conversion embodiment, other interconnects such as Ethernet, 3GIO, and Infiniband can be connected using a converter module as illustrated in FIG. 7, thus extending these interconnects across cross-connect backplane 300. As shown in FIG. 7, this can allow a blade 710 to be provided with a CPU 712, using memory on the separate blade 720 instead of on the CPU blade 710. Although FIG. 7 illustrates multiple blade types connected using converter modules 730 and 740, one skilled in the art will recognize any, all, or none of the blades connected to the cross-connect backplane 300 can use converter modules.

The routing engine 300 of FIGS. 3–7 can use any conventional technique for storing the information necessary for aliasing transactions across the cross-connect backplane 300. Further, the connection points 340, 350, 460, and 470 can also use any conventional technique for locally storing aliasing data supplied by the routing engine 330. Although shown as connected directly to the cross-connect interconnect 339, the routing engine can be embodied in the CPU 302 or in any other desirable fashion for providing aliasing data to connection points.

Further, although shown in FIG. 2 in a single blade server BS2, connected by a common backplane 200, multiple blade servers BS2 can be interconnected using the disclosed techniques. A single CPU 302 may be used to control multiple cross-connect backplanes 300, by using protocol interconnects such as the PCI-X serial interconnect, which can allow point-to-point connections between separated blade server backplane interconnects. In a disclosed embodiment, multiple CPUs 302, memories 304, bridges 308 and routing engines 330 can be utilized for backup and reliability.

The foregoing disclosure and description are illustrative and explanatory thereof and various changes in the components, circuit elements, circuit configurations, and signal connections, as well as in the details of the illustrated circuitry and construction and method of operation may be made without departing from the spirit and scope of the invention.

I claim:

1. A distributed computer system, comprising:
 a first subsystem;
 a second subsystem; and
 a cross-connect subsystem, couplable to the first subsystem and the second subsystem, the cross-connect subsystem comprising:
 a cross-connect interconnect, couplable to the first subsystem and to the second subsystem, the cross-connect interconnect transparently aliasing transactions between the first subsystem and the second subsystem as transactions on the cross-connect interconnect, wherein the second subsystem comprises a shared memory subsystem, the shared memory subsystem interpreting cache coherency attributes on transactions from the first subsystem to preserve cache coherency.

2. The distributed system of claim 1, the cross-connect subsystem comprising:
 a first cross-connect connector of the cross-connect interconnect, couplable to the first subsystem;
 a second cross-connect connector of the cross-connect interconnect, couplable to the second subsystem; and
 a routing engine, couplable to the first cross-connect connector and to the second cross-connect connector, the routing engine transparently aliasing transactions between the first subsystem and the second subsystem as transactions on the cross-connect interconnect.

3. The distributed system of claim 2, the cross-connect subsystem comprising:
 a cross-connect processor coupled to the routing engine;
 an operating system executed by the cross-connect processor comprising:
 a processor-executable code to create an aliasing table for use by the routing engine;
 a processor-executable code to update the aliasing table responsive to coupling either of the first subsystem or the second subsystem to the cross-connect subsystem; and
 a processor-executable code to update the aliasing table responsive to decoupling either of the first subsystem or the second subsystem from the cross-connect subsystem.

4. The distributed system of claim 1, wherein the cross-connect subsystem appears to the first subsystem and the second subsystem as an interconnect bridge.

5. The distributed system of claim 1, the first subsystem comprising:
 a first processor;
 a first processor interconnect coupled to the first processor; and
 a processor interconnect to interconnect converter, the first subsystem couplable to the cross-connect subsystem through the first processor interconnect to interconnect converter.

6. The distributed system of claim 1, comprising:
 a third subsystem, the third subsystem sharing the shared memory subsystem with the first subsystem, wherein the cross-connect interconnect transparently aliases transactions between the third subsystem and the second subsystem as transactions on the cross-connect interconnect.

7. The distributed system of claim 6, wherein the first subsystem and the third subsystem are invisible to each other.

8. The distributed system of claim 6, wherein the second subsystem is configured to allocate a first portion of the shared memory subsystem to the first subsystem and to allocate a second portion of the shared memory subsystem to the third subsystem.

9. A distributed computer system, comprising:
 a first subsystem;
 a second subsystem; and
 a cross-connect subsystem, couplable to the first subsystem and the second subsystem, the cross-connect subsystem comprising:

a cross-connect interconnect, couplable to the first subsystem and to the second subsystem, the cross-connect interconnect transparently aliasing transactions between the first subsystem and the second subsystem as transactions on the cross-connect interconnect, wherein the first subsystem comprises a first interconnect and wherein the second subsystem comprises a second interconnect, wherein the first interconnect, the second interconnect, and the cross-connect interconnect operate according to a common interconnect protocol, wherein the common interconnect protocol is the PCI-X protocol.

10. A distributed computer system, comprising:
a first subsystem;
a second subsystem; and
a cross-connect subsystem, couplable to the first subsystem and the second subsystem, the cross-connect subsystem comprising:
a cross-connect interconnect, couplable to the first subsystem and to the second subsystem, the cross-connect interconnect transparently aliasing transactions between the first subsystem and the second subsystem as transactions on the cross-connect interconnect, wherein the cross-connect subsystem comprises a backplane of a blade server.

11. A distributed computer system, comprising:
a first subsystem;
a second subsystem; and
a cross-connect subsystem, couplable to the first subsystem and the second subsystem, the cross-connect subsystem comprising:
a cross-connect interconnect, couplable to the first subsystem and to the second subsystem, the cross-connect interconnect transparently aliasing transactions between the first subsystem and the second subsystem as transactions on the cross-connect interconnect, wherein the first subsystem and the second subsystem are blades.

12. A method of connecting a first subsystem and a second subsystem of a computer system via a cross-connect interconnect, the method comprising:
transparently aliasing transactions between the first subsystem and the second subsystem as transactions on the cross-connect interconnect: and
configuring the first interconnect, the second interconnect, and the cross-connect interconnect accordmnn to a common protocol, wherein the common protocol is the PCI-X protocol.

13. The method of claim 12, comprising:
coupling a first interconnect of the first subsystem to the cross-connect interconnect of a cross-connect system; and
coupling a second interconnect of the second subsystem to the cross-connect interconnect,
wherein the first interconnect and the cross-connect interconnect are mutually invisible, and
wherein the second interconnect and the cross-connect interconnect are mutually invisible.

14. The method of claim 12,wherein transparently aliasing transactions comprises:
configuring a routing engine coupled to the cross-connect interconnect;
determining aliasing information with the routing engine for transactions between the first subsystem and the second subsystem; and converting transactions between the first subsystem and the second subsystem using the aliasing information determined by the routing engine.

15. The method of claim 14, wherein configuring the routing engine comprises:
configuring an alias table connected to the cross-connect interconnect; and
updating the alias table responsive to coupling or decoupling of an interconnect to the cross-connect interconnect.

16. A method of routing transactions from a first device of a first interconnect to a second device of a second interconnect across a cross-connect interconnect, the first interconnect having a first interconnect number, the second interconnect having a second interconnect number, and the cross-connect interconnect having a cross-connect interconnect number, the method comprising the steps of:
(a) assigning a first cross-connect interconnect device number to a first interconnect interface, the first interconnect coupled to the cross-connect interconnect via the first interconnect interface;
(b) assigning a second cross-connect interconnect device number to a second interconnect interface, the second interconnect coupled to the cross-connect interconnect via the second interconnect interface;
(c) receiving a transaction from the first interconnect on the cross-connect interconnect at the first interconnect interface;
(d) converting the transaction to indicate the second cross-connect interconnect device number of the cross-connect interconnect;
(e) transmitting the transaction across the cross-connect interconnect;
(f) converting the transaction to be destined to the second device of the second interconnect; and
(g) sending the transaction on the second interconnect, wherein the first interconnect, the second interconnect and the cross-connect interconnect operate according to the PCI-X protocol.

17. The method of claim 16, wherein step (d) is performed at the first interconnect interface.

18. The method of claim 16, wherein step (f) is performed at the second interconnect interface.

19. The method of claim 16, comprising the steps of:
updating an alias table mapping the first cross-connect interconnect device number and the first interconnect number to the first cross-connect interface device number and cross-connect interconnect number; and
updating an alias table mapping the second cross-connect interconnect device number and the second interconnect number to the second cross-connect interface device number and cross-connect interconnect number.

20. The method of claim 19, wherein steps (d) and (f) are performed using the alias table.

21. The method of claim 16, wherein steps (a)–(g) are performed in the recited order.

22. A cross-connect subsystem, couplable to a first subsystem and a second subsystem, the cross-connect subsystem comprising:
a cross-connect interconnect, couplable to the first subsystem and to the second subsystem, the cross-connect interconnect transparently aliasing transactions between the first subsystem and the second subsystem as transactions on the cross-connect interconnect, wherein the cross-connect subsystem is a backplane of a blade server.

23. The cross-connect subsystem of claim 22, comprising:

a cross-connect processor coupled to a routing engine;

an operating system executed by the cross-connect processor comprising:

a processor-executable code to store routing information of interconnect segments for use by the routing engine;

a processor-executable code to update the routing information responsive to coupling either of the first subsystem or the second subsystem to the cross-connect subsystem; and a processor-executable code to update the routing information responsive to decoupling either of the first subsystem or the second subsystem from the cross-connect subsystem.

24. The cross-connect subsystem of claim 22, wherein the first subsystem and the second subsystem are invisible to each other.

25. A cross-connect subsystem, couplable to a first subsystem and a second subsystem, the cross-connect subsystem comprising:

a cross-connect interconnect, couplable to the first subsystem and to the second subsystem, the cross-connect interconnect transparently aliasing transactions between the first subsystem and the second subsystem as transactions on the cross-connect interconnect, wherein the first subsystem comprises a first interconnect and wherein the second subsystem comprises a second interconnect, wherein the first interconnect, the second interconnect, and the cross-connect interconnect operate according to a common interconnect protocol, wherein wherein the common interconnect protocol is PCI-X protocol.

26. A computer system comprising:

a routing engine;

a first computer component coupled to the routing engine; and a second computer component coupled to the routing engine, wherein the routing engine is configured to simulate a PCI hierarchy for the first and second computer components and wherein the routing engine is transparent to the first and second computer components.

27. The computer system of claim 26, comprising a third computer component, wherein the routing engine is configured to simulate a PCI hierarchy for the first, second, and third computer components and wherein the routing engine is transparent to the first, second, and third computer components.

28. The computer system of claim 26, wherein the first computer component comprises a blade server.

29. A computer system comprising:

a PCI interconnect;

a first computer system coupled to the PCI interconnect;

a second computer system coupled to the PCI interconnect; and a PCI peripheral device coupled to the first computer system and the second computer system, wherein both the first computer system and the second computer system are configured to enumerate a PCI hierarchy including the PCI peripheral device.

30. The computer system of claim 29, comprising a routing engine configured to simulate a PCI Hierarchy for the first computer system, the second computer system, and the PCI peripheral device.

31. The computer system of claim 29, wherein the PCI peripheral device comprises a disk drive.

* * * * *

UNITED STATES PATENT AND TRADEMARK OFFICE
CERTIFICATE OF CORRECTION

PATENT NO. : 7,096,306 B2  Page 1 of 1
APPLICATION NO. : 10/209846
DATED : August 22, 2006
INVENTOR(S) : Dwight D. Riley It is certified that error appears in the above-identified patent and that said Letters Patent is hereby corrected as shown below:

In column 11, line 45, in Claim 12, delete "interconnect:" and insert -- interconnect; --, therefor.

In column 11, line 47, in Claim 12, delete "accordmnn" and insert -- according --, therefor.

In column 11, line 52, in Claim 13, after "coupling" delete "a" and insert -- the --, therefor.

In column 11, line 55, in Claim 13, after "coupling" delete "a" and insert -- the --, therefor.

In column 13, line 35, in Claim 25, after "wherein" delete "wherein".

Signed and Sealed this

Twenty-eighth Day of July, 2009

JOHN DOLL
*Acting Director of the United States Patent and Trademark Office*